United States Patent
Li

(10) Patent No.: US 10,743,702 B2
(45) Date of Patent: Aug. 18, 2020

(54) COOKING APPLIANCE, AND COOKING CONTROL METHOD AND DEVICE THEREOF

(71) Applicants: FOSHAN SHUNDE MIDEA ELECTRICAL HEATING APPLIANCES MANUFACTURING CO., LIMITED, Foshan (CN); MIDEA GROUP CO., LTD., Foshan (CN)

(72) Inventor: Nanjun Li, Foshan (CN)

(73) Assignees: FOSHAN SHUNDE MIDEA ELECTRICAL HEATING APPLIANCES MANUFACTURING CO., LIMITED, Foshan (CN); MIDEA GROUP CO,. LTD., Foshan (CN)

( * ) Notice: Subject to any disclaimer, the term of this patent is extended or adjusted under 35 U.S.C. 154(b) by 309 days.

(21) Appl. No.: 15/579,937

(22) PCT Filed: Jun. 24, 2015

(86) PCT No.: PCT/CN2015/082238
§ 371 (c)(1),
(2) Date: Dec. 5, 2017

(87) PCT Pub. No.: WO2016/192145
PCT Pub. Date: Dec. 8, 2016

(65) Prior Publication Data
US 2018/0213965 A1    Aug. 2, 2018

(30) Foreign Application Priority Data
Jun. 5, 2015   (CN) .......................... 2015 1 0305313

(51) Int. Cl.
 A47J 27/00  (2006.01)
 A23L 5/10   (2016.01)
 A47J 27/08  (2006.01)

(52) U.S. Cl.
CPC .............. *A47J 27/0802* (2013.01); *A23L 5/13* (2016.08); *A47J 27/00* (2013.01); *A47J 27/004* (2013.01)

(58) Field of Classification Search
CPC ...... A47J 27/0802; A47J 27/00; A47J 27/004; A47J 27/088; A47J 27/086; A23L 5/13; G06K 7/10881
See application file for complete search history.

(56) References Cited

U.S. PATENT DOCUMENTS

2015/0026049 A1* 1/2015 Theurer ................. G06Q 20/36
                                                              705/41
2018/0279656 A1* 10/2018 Takahashi ................ A23L 7/10

FOREIGN PATENT DOCUMENTS

CN    1919119 A    2/2007
CN    1927101 A    3/2007
(Continued)

OTHER PUBLICATIONS

Fukuda, JP 2007-054476-A Machine Translation 2007 (Year: 2007).*
(Continued)

*Primary Examiner* — Lee A Holly
(74) *Attorney, Agent, or Firm* — Kilpatrick Townsend & Stockton, LLP

(57) ABSTRACT

A cooking control method of a cooking appliance comprises the following steps: acquiring a rice species identifier of rice to be cooked (S1); receiving cooking preference information of a user (S2); acquiring a corresponding rice species type according to the rice species identifier (S3); acquiring a corresponding cooking curve according to the cooking preference information and the rice species type (S4); and (Continued)

controlling the cooking appliance according to the cooking curve (S5). The cooking control method controls a cooking process according to user preference and the rice species type, thus greatly improving a cooking effect of the cooking appliance, and improving use satisfaction of the user. Also disclosed are a cooking appliance and cooking control device thereof.

9 Claims, 4 Drawing Sheets

(56) References Cited

FOREIGN PATENT DOCUMENTS

| CN | 101243842 A | | 8/2008 |
|---|---|---|---|
| CN | 101364094 A | | 2/2009 |
| CN | 101587330 A | | 11/2009 |
| JP | 2000139691 A | | 5/2000 |
| JP | 2004275226 A | | 10/2004 |
| JP | 2005168705 A | | 6/2005 |
| JP | 2006150056 A | * | 6/2006 |
| JP | 2006150056 A | | 6/2006 |
| JP | 2007000327 A | | 1/2007 |
| JP | 2007054476 A | * | 3/2007 |
| JP | 2007054476 A | | 3/2007 |
| JP | 2012231915 A | | 11/2012 |
| JP | 2015069722 A | * | 4/2015 |

OTHER PUBLICATIONS

Kono, JP 2006-150056-A Machine Translation 2006 (Year: 2006).*
Japanese Office Action dated Nov. 8, 2018 in the corresponding JP application(application No. 2018-515338).
The Office Action dated Jul. 2, 2019 in the corresponding JP application No. 2018-515338.

* cited by examiner

COOKING APPLIANCE, AND COOKING CONTROL METHOD AND DEVICE THEREOF

CROSS-REFERENCE TO RELATED APPLICATION

This application is a national phase entry under 35 USC § 371 of International Application PCT/CN2015/082238, filed Jun. 24, 2015, which claims priority to and benefits of Chinese Patent Applications Serial No. 201510305313.2, filed with the State Intellectual Property Office of P. R. China on Jun. 5, 2015, the entire contents of which are incorporated herein by reference.

FIELD

The present disclosure relates to the field of household appliances, and more particularly to a cooking utensil, a cooking control method of a cooking utensil, and a cooking control device of a cooking utensil.

BACKGROUND

At present, a cooking utensil (such as a rice cooker, etc.) generally uses a single cooking program to control a cooking function. In other words, at present, the cooking utensil provides different cooking objects and different users with a same cooking process (such as heating and cooking stages) in a single control mode, which lacks of pertinence and cannot fully meet the different needs of users, resulting in unsatisfactory cooking effects.

SUMMARY

The present disclosure seeks to solve at least one of the technical problems existing in the related art to at least some extent.

Therefore, the first object of the present disclosure is to provide a cooking control method of a cooking utensil, which can set the cooking method according to a user's preference and a rice type, thereby greatly improving the cooking effect of the cooking utensil and meeting the user's requirement of use.

A second object of the present disclosure is to provide a cooking control device of a cooking utensil.

A third object of the present disclosure is to provide a cooking utensil.

In order to realize the above objects, an embodiment of a first aspect of the present disclosure provides a cooking control method of a cooking utensil, including:

acquiring a rice species identifier of rice to be cooked;
receiving cooking preference information of a user;
acquiring a rice species type corresponding to the rice species identifier;
acquiring a cooking curve corresponding to the cooking preference information and the rice species type; and
controlling the cooking utensil based on the cooking curve.

In the cooking control method of the cooking utensil according to embodiments of the present disclosure, the rice species identifier of rice to be cooked is firstly acquired; and the rice species type is queried based on the rice species identifier acquired; meanwhile the cooking preference information of the user is received; then the cooking curve corresponding to the cooking preference information and the rice species type is acquired; and a cooking process of the cooking utensil is controlled based on the cooking curve, such that the cooking process is adapted to the rice species, thereby greatly improving the cooking effect of the cooking utensil and meeting the user's requirement of use.

In addition, the cooking control method of the cooking utensil according to the above embodiment of the present disclosure further has the following additional technical features.

In an embodiment of the present disclosure, the cooking curve includes at least one cooking stage, with each cooking stage having an individual control parameter, and controlling the cooking utensil based on the cooking curve comprises: controlling the cooking utensil to cook the rice to be cooked in the at least one cooking stage based on the individual control parameter corresponding to the at least one cooking stage, respectively.

In an embodiment of the present disclosure, the rice species type includes long grain rice and short grain rice, the at least one cooking stage includes a water absorption stage, and a control parameter corresponding to the water absorption stage includes a water absorption temperature and/or duration, and the water absorption temperature of the long grain rice in the water absorption stage is lower than that of the short grain rice in the water absorption stage; and/or the duration of the long grain rice for the water absorption stage is less than that of the short grain rice in the water absorption stage. In the cooking control method of the cooking utensil according to embodiments of the present disclosure, because the long grain rice is of higher water absorption and faster expansion rate than that of the short grain rice, the water absorption temperature of the long grain rice in the water absorption stage is set to be lower than that of the short grain rice, and/or the duration of the long grain rice for the water absorption stage is set to be shorter than that of the short grain rice, thereby avoiding the cooked rice from insufficient gelatinization and severe dryness at top on account of premature completion of water absorption during the cooking process for the long grain rice with higher water absorption and faster expansion rate, and avoiding poor texture on account of less water absorption for the short grain rice with lower water absorption and slower expansion rate.

In an embodiment of the present disclosure, the water absorption temperature of the long grain rice in the water absorption stage is equal to or less than 50° C.; and the water absorption temperature of the short grain rice in the water absorption stage is between 40° C. and 65° C.; and/or the duration of the long grain rice for the water absorption stage is equal to or less than 10 min; and the duration of the short grain rice for the water absorption stage is between 2 min and 30 min.

In an embodiment of the present disclosure, the rice species type includes long grain rice and short grain rice, the at least one cooking stage includes a heating stage, and a control parameter corresponding to the heating stage includes a heating mode and heating power, and acquiring a cooking curve corresponding to the cooking preference information and the rice species type includes: setting the heating mode of the heating stage as continuous heating and the heating power of the heating stage as full power in a case that the rice species type is the long grain rice; setting the heating mode and the heating power of the heating stage based on an amount of the rice to be cooked in a case that the rice species type is the short grain rice.

In the cooking control method of the cooking utensil according to embodiments of the present disclosure, the long grain rice is continuously heated under full power in the heating stage, thereby avoiding the long grain rice from absorbing water and expanding prematurely and excessively during the cooking process, thus avoiding the cooked rice from severe dryness at top on account of premature completion of water absorption, such that sufficient water is guaranteed for keeping boiling after the cooking utensil enters the boiling stage. In addition, the heating mode and the heating power of the heating stage are set based on the amount of the short grain rice to be cooked, such that the short grain rice in large amounts is heated in a continuous mode and/or under higher heating power; while the short grain rice in few amounts is heated in an intermittent mode and/or under lower heating power, thereby ensuring the short grain rice absorbing water more sufficiently, giving cooked short grain rice with better texture.

In an embodiment of the present disclosure, controlling the cooking utensil based on the cooking curve includes: controlling the cooking utensil to enter a boiling stage after the heating stage is completed.

In the cooking control method of the cooking utensil according to embodiments of the present disclosure, the cooking utensil is controlled to enter the boiling stage, allowing the rice to absorb water sufficiently during the cooking process, thereby giving cooked rice with better texture. In specific, if sufficient water is provided for cooking the rice in the heating process, the sufficient water allows the rice under cooking to maintain in a boiling state during the boiling stage, thereby giving the cooked rice after boiled with better texture. In one embodiment, the cooking utensil is controlled to enter a braising stage after the boiling stage, thereby further improving the texture of the cooked rice.

In an embodiment of the present disclosure, the rice species identifier is obtained by scanning with a viewfinder provided by the cooking utensil or a mobile terminal of the user.

In an embodiment of the present disclosure, the cooking control method of the cooking utensil acquires the rice species identifier by scanning a two-dimensional code in a rice bag. Alternatively, the rice species identifier is acquired from an e-commerce purchase record of the user. Alternatively, the rice species identifier is input with the cooking utensil or a mobile terminal of the user.

In an embodiment of the present disclosure, the cooking preference information of the user includes one or more of texture information, viscosity information and flavor information selected by the user.

In an embodiment of the present disclosure, the cooking utensil includes a rice cooker, an induction cooker or an electric pressure cooker.

In order to realize the above objects, an embodiment of a second aspect of the present disclosure provides a cooking control device of a cooking utensil, including:

a first acquiring module configured to acquire a rice species identifier of rice to be cooked;

a receiving module configured to receive cooking preference information of a user;

a second acquiring module configured to acquire a rice species type corresponding to the rice species identifier;

a third acquiring module configured to acquire a cooking curve corresponding to the cooking preference information and the rice species type; and a controlling module configured to control the cooking utensil based on the cooking curve.

In the cooking control device of the cooking utensil according to embodiments of the present disclosure, the first acquiring module acquires the rice species identifier of rice to be cooked and the receiving module receives the cooking preference information of the user at first; and then the second acquiring module acquires the rice species type corresponding to the rice species identifier acquired by the first acquiring module; afterward, the third acquiring module acquires the cooking curve corresponding to the cooking preference information and the rice species type and the controlling module controls the cooking utensil based on the cooking curve, such that the cooking utensil is controlled with the cooking process specific for the cooking preference information of the user and the rice species type, thereby improving cooking effects of the cooking utensil.

In an embodiment of the present disclosure, the cooking curve includes at least one cooking stage, with each cooking stage having an individual control parameter, and the controlling module is further configured to: control the cooking utensil to cook the rice to be cooked in the at least one cooking stage based on the individual control parameter corresponding to the at least one cooking stage, respectively.

In an embodiment of the present disclosure, the rice species type includes long grain rice and short grain rice, the at least one cooking stage includes a water absorption stage, and a control parameter corresponding to the water absorption stage includes a water absorption temperature and/or duration, and the water absorption temperature of the long grain rice in the water absorption stage is lower than that of the short grain rice in the water absorption stage; and/or the duration of the long grain rice for the water absorption stage is less than that of the short grain rice in the water absorption stage.

In the cooking control device of the cooking utensil according to embodiments of the present disclosure, because the long grain rice is of higher water absorption and faster expansion rate than that of the short grain rice, the water absorption temperature of the long grain rice in the water absorption stage is set to be lower than that of the short grain rice, and/or the duration of the long grain rice for the water absorption stage is set to be shorter than that of the short grain rice, thereby avoiding the cooked rice from insufficient gelatinization and severe dryness at top on account of premature completion of water absorption during the cooking process for the long grain rice with higher water absorption and faster expansion rate, and avoiding poor texture on account of less water absorption for the short grain rice with lower water absorption and slower expansion rate.

In an embodiment of the present disclosure, the water absorption temperature of the long grain rice in the water absorption stage is equal to or less than 50° C.; and the water absorption temperature of the short grain rice in the water absorption stage is between 40° C. and 65° C.; and/or the duration of the long grain rice for the water absorption stage is equal to or less than 10 min; and the duration of the short grain rice for the water absorption stage is between 2 min and 30 min.

In an embodiment of the present disclosure, the rice species type includes long grain rice and short grain rice, the at least one cooking stage includes a heating stage, and a control parameter corresponding to the heating stage includes a heating mode and heating power, and the third acquiring module is further configured to: set the heating mode of the heating stage as continuous heating and the heating power of the heating stage as full power in a case that the rice species type is the long grain rice; and set the heating mode and the heating power of the heating stage based on an amount of the rice to be cooked in a case that the rice species type is the short grain rice.

In the cooking control device of the cooking utensil according to embodiments of the present disclosure, the long grain rice is continuously heated under full power in the heating stage, thereby avoiding the long grain rice from absorbing water and expanding prematurely and excessively during the cooking process, thus avoiding the cooked rice from severe dryness at top on account of premature completion of water absorption, such that sufficient water is guaranteed for keeping boiling after the cooking utensil enters the boiling stage. In addition, the heating mode and the heating power of the heating stage are set based on the amount of the short grain rice to be cooked, such that the short grain rice in large amounts is heated in a continuous mode and/or under higher heating power; while the short grain rice in few amounts is heated in an intermittent mode and/or under lower heating power, thereby ensuring the short grain rice absorbing water more sufficiently, giving cooked short grain rice with better texture.

In an embodiment of the present disclosure, the control module is further configured to: control the cooking utensil to enter a boiling stage after the heating stage is completed.

In an embodiment of the present disclosure, the rice species identifier is obtained by scanning with a viewfinder provided by the cooking utensil or a mobile terminal of the user.

In an embodiment of the present disclosure, the cooking control device of the cooking utensil acquires the rice species identifier by scanning a two-dimensional code in a rice bag. Alternatively, the rice species identifier is acquired from an e-commerce purchase record of the user. Alternatively, the rice species identifier is input with the cooking utensil or a mobile terminal of the user.

In an embodiment of the present disclosure, the cooking preference information of the user comprises one or more of texture information, viscosity information and flavor information selected by the user.

In an embodiment of the present disclosure, the cooking utensil includes a rice cooker, an induction cooker or an electric pressure cooker.

An embodiment of the present disclosure further provides a cooking utensil, which includes the above cooking control device of the cooking utensil.

The cooking mode of the cooking utensil can be set, by the above-described cooking control device of the cooking utensil, based on the cooking preference information of the user and the rice species type, thereby significantly improving the cooking effects of the cooking utensil and improving satisfaction of the user.

Additional aspects and advantages of the embodiments of the present disclosure will be set forth in the following description part, some will become apparent from the following descriptions, or may be learned from implementation of the present disclosure.

DETAILED DESCRIPTION

Figure 1:
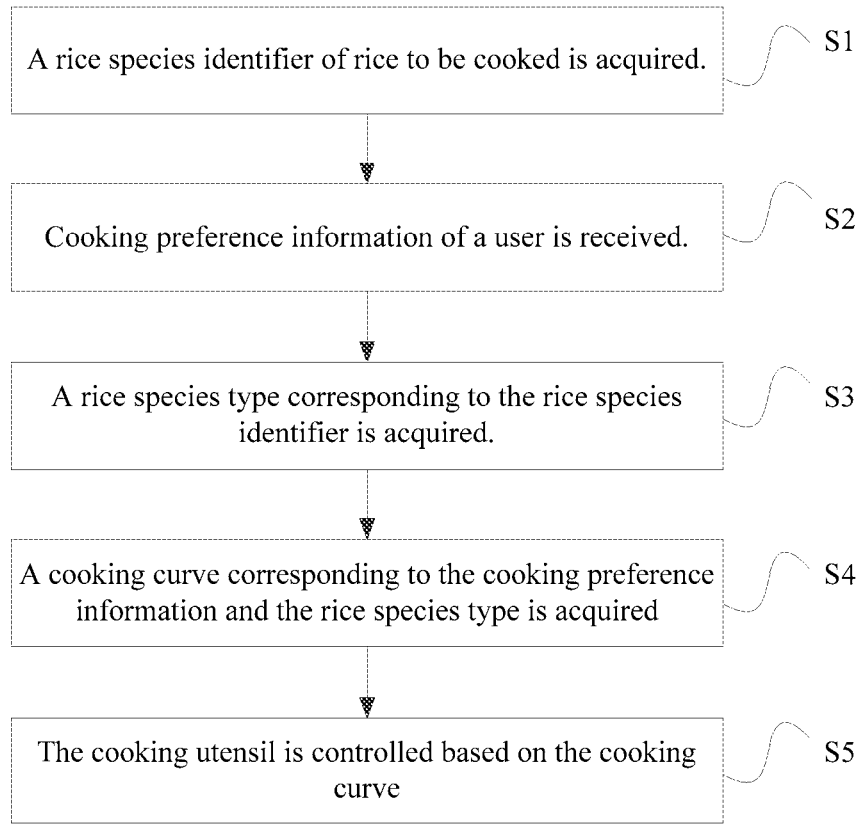
FIG. 1 is a flowchart of a cooking control method of a cooking utensil according to an embodiment of the present disclosure.

Reference will be made in detail to embodiments of the present disclosure. The same or similar elements and the elements having same or similar functions are denoted by like reference numerals throughout the descriptions. The embodiments described herein with reference to drawings are explanatory, illustrative, and used to generally understand the present disclosure. The embodiments shall not be construed to limit the present disclosure.

In the description of the present disclosure, the orientation or the positional relationship indicated by terms such as "central", "longitudinal", "lateral", "length", "width", "thickness", "above", "below", "front", "rear", "right", "left", "vertical", "horizontal", "top", "bottom", "inner", "outer", "clockwise", "counterclockwise", "axial", "radial", "circumferential" etc. should be construed to refer to orientation or positional relationship as shown in the drawings. These terms are merely for convenience of description of the present disclosure and simplified description, rather than indicating or implying that the referred device or element may have a one orientation, be constructed and operated in an orientation, and therefore should not be construed as limiting the disclosure.

In addition, terms such as "first" and "second" are used herein for purposes of description and are not intended to indicate or imply relative importance or significance or to imply the number of indicated technical features. Thus, the feature defined with "first" and "second" may comprise one or more of this feature. In the description of the present disclosure, "a plurality of" means two or more than two, for example, two or three, etc., unless specified otherwise.

In the present disclosure, unless specified or limited otherwise, the terms "mounted", "connected", "coupled", "fixed" and the like are used broadly, and may be, for example, fixed connections, detachable connections, or integral connections; may also be mechanical or electrical connections; may also be direct connections or indirect connections via intervening structures; may also be inner communications of two elements or an interaction between two elements, unless limited otherwise. For those skilled in the art, the specific meanings of the above terms in the present disclosure may be understood based on specific situations.

In the present disclosure, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on", "above", or "on top of" a second feature may include an embodiment in which the first feature is right or obliquely "on", "above" or "on top of" the second feature, or just means that the first feature is at a height higher than that of the second feature; while a first feature "below", "under" or "on bottom of" a second feature may include an embodiment in which the first feature is right or obliquely "below", "under" or "on bottom of" the second feature, or just means that the first feature is at a height lower than that of the second feature.

Before describing the present disclosure, a brief introduction is made to a relationship between amylose content and cooking quality of rice. The amylose content is directly proportional to hardness of the rice, and is inversely proportional to a water absorption rate of the rice.

Specifically, when the amylose content of the rice is high (such as long grain rice), such rice is of a high water absorption rate and a rapid expansion rate (for example over 80° C.). For example, a longer water absorption time set at a certain temperature in the heating stage leads to insufficient time for keeping the rice at the boiling state on account of premature absorption of water, thus giving insufficient gelatinized rice with poor texture; and leads to severe dryness for rice located at the middle-upper part where it is impossible to absorb more heat on account of premature completion of water absorption, thus resulting in uneven texture for all rice in the cooking utensil. Besides, as rice in low amylose content is of a low water absorption rate and a low expansion rate, it may be necessary to set a certain water absorption time at a specific temperature to allow enough water absorption and gelatinization for the rice under cooking, thereby ensuring good texture. However, since the cooking control protocol proposed in the related art does not take differences of the rice species into consideration, the same cooking control protocol for different types of rice adversely affects the cooking effects of the cooking utensil, giving the cooked rice with poor texture.

Therefore, in order to solve the above problems, the present disclosure provides in embodiments a cooking control method of a cooking utensil, a cooking control device of a cooking utensil and a cooking utensil including said cooking control device.

Next, the cooking control method of the cooking utensil, the cooking control device of the cooking utensil and the cooking utensil including the cooking control device provided in embodiments of the present disclosure will be described with reference to the drawings.

In embodiments of the present disclosure, the cooking utensil may comprise but not limited to a rice cooker, an induction cooker or an electric pressure cooker.

FIG. 1 is a flowchart of a cooking control method of a cooking utensil according to an embodiment of the present disclosure. As shown in FIG. 1, the cooking control method of the cooking utensil includes the following steps S1 to S5.

S1, a rice species identifier of rice to be cooked is acquired.

The rice species identifier is used as a unique identifier to identify the rice species.

In an embodiment of the present disclosure, the rice species identifier may be acquired with the cooking utensil or a mobile terminal of the user. Specifically, the rice species identifier may be acquired by scanning with a viewfinder provided by the cooking utensil or the mobile terminal of the user. The mobile terminal may include, but not limited to, a terminal device such as a mobile phone, a laptop, a tablet computer or the like.

In an embodiment of the present disclosure, the rice species identifier may be acquired by scanning a two-dimensional code in a rice bag. Alternatively, the rice species identifier may be acquired from an e-commerce purchase record of the user. Alternatively, the rice species identifier may be input with the cooking utensil or the mobile terminal the user. For example, the cooking utensil or the mobile terminal may provide a human-machine interface or a voice input prompt, so that the user can input the rice species identifier through the man-machine interface or with voice.

S2, cooking preference information of a user is received.

Specifically, the cooking utensil or the mobile terminal may provide an operation interface, a voice interaction interface or a setting option, and the like, so that the user may input the cooking preference information through the operation interface provided by the cooking utensil, input the cooking preference information by voice or select the cooking preferences information from the setting option.

In an embodiment of the present disclosure, the cooking preference information of the user may include one or more of texture information, viscosity information and flavor information selected by the user.

S3, a rice species type corresponding to the rice species identifier is acquired.

Specifically, the cooking utensil or the mobile terminal may send a data request for querying the rice species type corresponding to the rice species identifier to a cloud server.

The cloud server may include a data processing module, a rice species database and a cooking program database. The rice species database stores a correspondence between a rice species identifier and a corresponding rice species type. The cooking program database stores a cooking curve corresponding to the cooking preference information of different users and the rice species type.

The data processing module of the cloud server may receive the data request and query the rice species database according to the data request to acquire the rice species type corresponding to the rice species identifier.

The rice species type includes long grain rice and short grain rice. The long grain rice includes but not limited to silk seedlings rice, cats teeth rice, Thai fragrant rice and the like; and the short grain rice includes but not limited to Northeast rice, pearl rice, Jiangsu round rice and the like.

S4, a cooking curve corresponding to the cooking preference information and the rice species type is acquired.

In an embodiment of the present disclosure, the data processing module in the cloud server may query the cooking curve in the cooking program database corresponding to the cooking preference information of the user and the rice species type.

S5: the cooking utensil is controlled based on the cooking curve.

In an embodiment of the present disclosure, the cooking curve includes at least one cooking stage. For example, the cooking curve may include a water absorption stage, a heating stage, a boiling stage, a braising stage, and the like. Each cooking stage has its own individual control parameter. For example, for the water absorption stage, the control parameter may include a water absorption temperature and/or duration, and the like. For the heating stage, the control parameter may include a heating mode, heating power, and the like. It is allowed to control the cooking utensil to cook the rice to be cooked in the at least one cooking stage based on the individual control parameter corresponding to the at least one cooking stage, respectively. Specifically, the cooking curve may be analyzed to acquire the control parameter, and the cooking utensil can be controlled based on the control parameter.

In an embodiment of the present disclosure, the at least one cooking stage may include a water absorption stage. More specifically, each water absorption stage has its own water absorption temperature and/or duration. Since because the long grain rice is of higher water absorption and faster expansion rate than that of the short grain rice, in embodiments of the present disclosure, the water absorption temperature of the long grain rice in the water absorption stage is set to be lower than that of the short grain rice in the water absorption stage; and/or the duration of the long grain rice for the water absorption stage is set to be less than that of the short grain rice in the water absorption stage. In a specific embodiment of the present disclosure, no water absorption stage may be provided for the long grain rice, thereby avoiding the cooked rice from insufficient gelatinization and severe dryness at top on account of premature completion of water absorption during the cooking process for the long grain rice with higher water absorption and faster expansion rate, and avoiding poor texture on account of less water absorption for the short grain rice with lower water absorption and slower expansion rate, thus giving cooked rice with improved texture.

In an embodiment of the present disclosure, the water absorption temperature of the long grain rice in the water absorption stage may be set to be equal to or less than 50° C.; and the water absorption temperature of the short grain rice in the water absorption stage may be set to be between 40° C. and 65° C.; and/or the duration of the long grain rice for the water absorption stage may be set to be equal to or less than 10 min; and the duration of the short grain rice for the water absorption stage may be set to be between 2 min and 30 min.

In an embodiment of the present disclosure, the at least one cooking stage may include a heating stage, with a control parameter including a heating mode and heating power. In some embodiments of the present disclosure, for the long grain rice, the heating mode of the heating stage is set as continuous heating and the heating power of the heating stage is set as full power; while for the short grain rice, the heating mode and the heating power of the heating stage are set based on an amount of the rice to be cooked. For example, rice in large amounts is heated in a continuous mode and/or under higher heating power; while rice in few amounts is heated in an intermittent mode and/or under lower heating power. As such, the long grain rice is heated continuously under the full power in the heating stage, thereby avoiding the long grain rice from absorbing water and expanding prematurely and excessively during the cooking process, thus avoiding the cooked rice from severe dryness at top on account of premature completion of water absorption, such that sufficient water is guaranteed for keeping boiling after the cooking utensil enters the boiling stage. On the other hand, the heating mode and the heating power of the heating stage are set based on the amount of the short grain rice, such that the short grain rice in large amounts is heated in a continuous mode and/or under higher heating power; while the short grain rice in few amounts is heated in an intermittent mode and/or under lower heating power, thereby ensuring the short grain rice absorbing water more sufficiently, giving cooked short grain rice with better texture.

In addition, in an embodiment of the present disclosure, the cooking control method of the cooking utensil further includes controlling the cooking utensil to enter a boiling stage after the heating stage is completed. The cooking utensil is controlled to enter the boiling stage, allowing the rice under cooking to absorb water sufficiently during the cooking process, thus giving the cooked rice with improved texture. In specific, if sufficient water is provided for cooking the rice in the heating process, the sufficient water allows the rice under cooking to maintain in a boiling state during the boiling stage, thereby giving the cooked rice after boiled with better texture. In one embodiment, the cooking utensil is controlled to enter a braising stage after the boiling stage, thereby further improving the texture of the cooked rice.

Further, the control parameter may be adjusted according to a cooking status parameter of the electric cooking utensil (such as a water content of the rice under cooking (e.g., in a pot), whether the rice under cooking is boiling, and the like) during the process of controlling the electric cooking utensil.

In the cooking control method of the cooking utensil according to embodiments of the present disclosure, the rice species identifier of rice to be cooked and the rice species type is queried based on the rice species identifier acquired, meanwhile the cooking preference information of the user is received; then the cooking curve corresponding to the cooking preference information and the rice species type is acquired; and the cooking utensil is controlled based on the cooking curve acquired, i.e. it is possible to control the cooking utensil based on different rice species types, texture, flavors or the cooking preference information of the user, thereby greatly improving the cooking effects of the cooking utensil and meeting the user's different requirements of use.

In an embodiment of the present disclosure, the cooking status parameter may be sent to the cloud server in real time for storage and analysis. The cooking utensil adjusts the cooking curve according to the cooking status parameter sent back from the cloud server. That is, the cooking utensil can establish a closed-loop improvement process during the cooking process with the cooking status parameter sent back, so that the cooking utensil is provide with a machine learning function. By continuous learning, the cooking effects of the cooking utensil can be continuously improved with the use of the cooking utensil so as to better meet the needs of the user.

Figure 2:
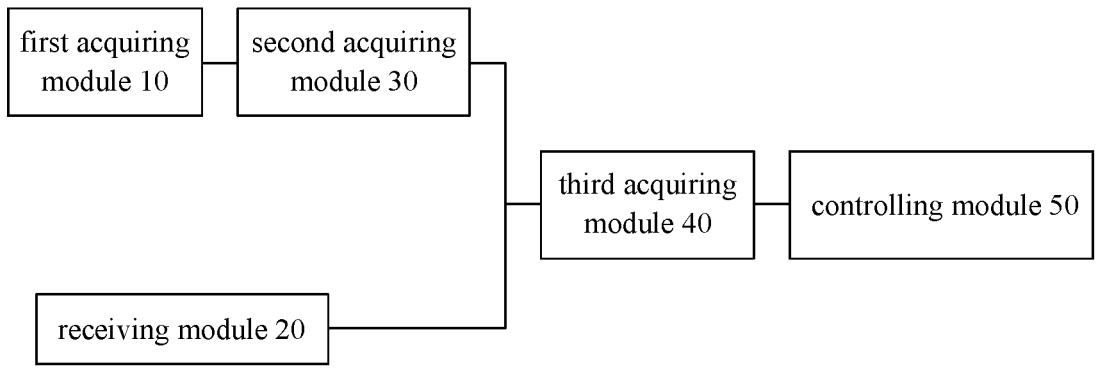
FIG. 2 is a block schematic diagram of a cooking control device of a cooking utensil according to an embodiment of the present disclosure.

FIG. 2 is a block schematic diagram of a cooking control device of a cooking utensil according to an embodiment of the present disclosure. As shown in FIG. 2, the cooking control device of the cooking utensil includes: a first acquiring module 10, a receiving module 20, a second acquiring module 30, a third acquiring module 40 and a controlling module 50.

Specifically, the first acquiring module 10 is configured to acquire a rice species identifier of rice to be cooked.

The rice species identifier is used as a unique identifier to identify the rice species.

In an embodiment of the present disclosure, the first acquiring module 10 may be disposed in the cooking utensil or a mobile terminal for acquiring the rice species identifier. More specifically, the rice species identifier may be obtained by scanning with a viewfinder provided by the cooking utensil or the mobile terminal of the user. The mobile terminal may include, but not limited to, a terminal device such as a mobile phone, a laptop, a tablet computer or the like.

In an embodiment of the present disclosure, the first acquiring module 10 may acquire the rice species identifier by scanning a two-dimensional code in a rice bag. Alternatively, the first acquiring module 10 may acquire the rice species identifier from an e-commerce purchase record of the user. Alternatively, the first acquiring module 10 may acquire the rice species identifier by the user inputting with the cooking utensil or a mobile terminal. For example, the cooking utensil or the mobile terminal may provide a human-machine interface or a voice input prompt, so that the user can input the rice species identifier through the man-machine interface or with voice.

The receiving module 20 is configured to receive cooking preference information of a user.

Specifically, the receiving module 20 may be disposed in the cooking utensil or the mobile terminal. More specifically, the cooking utensil may provide an operation interface, a voice interaction interface or a setting option, and the like, so that the user may input the cooking preference information through the operation interface provided by the cooking utensil, input cooking preference information by voice or select the cooking preferences information from the setting option.

In an embodiment of the present disclosure, the cooking preference information of the user may include one or more of texture information, viscosity information and flavor information selected by the user.

The second acquiring module 30 is configured to acquire a rice species type corresponding to the rice species identifier acquired by the first acquiring module 10.

Specifically, the cloud server of the cooking utensil stores a correspondence between a rice species identifier and a corresponding rice species type. The second acquiring module 30 may send a data request for querying the rice species type corresponding to the rice species identifier to a cloud server, so as to acquire the rice species type corresponding to the rice species identifier.

The rice species type includes long grain rice and short grain rice. The long grain rice includes but not limited to silk seedlings rice, cats teeth rice, Thai fragrant rice and the like; and the short grain rice includes but not limited to Northeast rice, pearl rice, Jiangsu round rice and the like.

The third acquiring module 40 is configured to acquire a cooking curve corresponding to the cooking preference information received by the receiving module 20 and the rice species type acquired by the second acquiring module 30.

In an embodiment of the present disclosure, the cloud server stores a cooking program database, which further stores a cooking curve corresponding to the cooking preference information of different users and the rice species type. The third acquiring module 40 may query the cooking program database based on the cooking preference information of the user and the rice species type to acquire the cooking curve correspondingly.

The controlling module 50 is configured to control the cooking utensil based on the cooking curve. In an embodiment of the present disclosure, the cooking curve includes at least one cooking stage. For example, the cooking curve may include a water absorption stage, a heating stage, a boiling stage, a braising stage, and the like. Each cooking stage has its own individual control parameter. For example, for the water absorption stage, the control parameter may include a water absorption temperature and/or duration, and the like. For the heating stage, the control parameter may include a heating mode, heating power, and the like. The controlling module 50 may control the cooking utensil to cook the rice to be cooked in the at least one cooking stage based on the individual control parameter corresponding to the at least one cooking stage, respectively. Specifically, the cooking curve may be analyzed to acquire the control parameter, and the cooking utensil may be controlled based on the control parameter.

In an embodiment of the present disclosure, the at least one cooking stage may include a water absorption stage. More specifically, each water absorption stage has its own water absorption temperature and/or duration. Since because the long grain rice is of higher water absorption and faster expansion rate than that of the short grain rice, in embodiments of the present disclosure, the controlling module 50 controls the water absorption temperature of the long grain rice in the water absorption stage to be lower than that of the short grain rice in the water absorption stage; and/or the duration of the long grain rice for the water absorption stage to be less than that of the short grain rice in the water absorption stage. In a specific embodiment of the present disclosure, no water absorption stage may be provided for the long grain rice, thereby avoiding the cooked rice from insufficient gelatinization and severe dryness at top on account of premature completion of water absorption during the cooking process for the long grain rice with higher water absorption and faster expansion rate, and avoiding poor texture on account of less water absorption for the short grain rice with lower water absorption and slower expansion rate, thus giving cooked rice with improved texture.

In an embodiment of the present disclosure, the water absorption temperature of the long grain rice in the water absorption stage may be set to be equal to or less than 50° C.; and the water absorption temperature of the short grain rice in the water absorption stage may be set to be between 40° C. and 65° C.; and/or the duration of the long grain rice for the water absorption stage may be set to be equal to or less than 10 min; and the duration of the short grain rice for the water absorption stage may be set to be between 2 min and 30 min.

In an embodiment of the present disclosure, the at least one cooking stage may include a heating stage. More specifically, each heating stage includes an individual heating mode and heating power. In some embodiments of the present disclosure, for the long grain rice, the controlling module 50 controls to set the heating mode of the heating stage as continuous heating and controls to set the heating power of the heating stage as full power; while for the short grain rice, the controlling module 50 controls to set the heating mode and the heating power of the heating stage based on an amount of the rice to be cooked. For example, the controlling module 50 controls to set a continuous mode and/or a higher heating power for heating that rice in large amounts; while the controlling module 50 controls to set an intermittent mode and/or a lower heating power for heating rice in few amounts. As such, the controlling module 50 controls that the long grain rice is heated continuously under the full power in the heating stage, thereby avoiding the long grain rice from absorbing water and expanding prematurely and excessively during the cooking process, thus avoiding the cooked rice from severe dryness at top on account of premature completion of water absorption, such that sufficient water is guaranteed for keeping boiling after the cooking utensil enters the boiling stage. On the other hand, the controlling module 50 controls that the heating mode and the heating power of the heating stage are set based on the amount of the short grain rice, such that the short grain rice in large amounts is heated in a continuous mode and/or under higher heating power; while the short grain rice in few amounts is heated in an intermittent mode and/or under lower heating power, thereby ensuring the short grain rice absorbing water more sufficiently, giving cooked short grain rice with better texture.

In addition, in an embodiment of the present disclosure, the controlling module 50 included in the cooking control device of the cooking utensil is further configured to control to the cooking utensil to enter a boiling stage after the heating stage is completed. The controlling module 50 controls the cooking utensil to entry the boiling stage, allowing the rice under cooking to absorb water sufficiently during the cooking process, thus giving the cooked rice with improved texture. In specific, if sufficient water is provided for cooking the rice in the heating process, the sufficient water allows the rice under cooking to maintain in a boiling state during the boiling stage, thereby giving the cooked rice after boiled with better texture. In one embodiment, after the boiling stage, the controlling module 50 may further control the cooking utensil to enter a braising stage, thereby further improving the texture of the cooked rice.

Further, the controlling module 50 may adjust the control parameter according to a cooking status parameter of the electric cooking utensil (such as a water content of the rice under cooking (e.g., in a pot), whether the rice under cooking is boiling, and the like) during the process of controlling the cooking utensil.

In an embodiment of the present disclosure, the cooking status parameter may be sent back to the cloud server in real time for storage and analysis. The cooking utensil adjusts the cooking curve according to the cooking status parameter sent back from the cloud server. That is, the cooking utensil can establish a closed-loop improvement process during the cooking process with the cooking status parameter sent back, so that the cooking utensil is provide with a machine learning function. By continuous learning, the cooking effects of the cooking utensil can be continuously improved with the use of the cooking utensil so as to better meet the needs of the user.

In the cooking control device of the cooking utensil according to embodiments of the present disclosure, the second acquiring module acquires the rice species type corresponding to the rice species identifier acquired by the first acquiring module; the third acquiring module acquires the cooking curve corresponding to the rice species type acquired by the second acquiring module and the cooking preference information of the user received by the receiving module; and the controlling module controls the cooking utensil based on the cooking curve acquired, i.e. the heating module controls the cooking utensil based on different rice species types, taste, flavors or the cooking preference information of the user, thereby greatly improving the cooking effects of the cooking utensil and meet the user's different requirements of use.

A process of controlling a cooking process of a cooking utensil according to an embodiment of the present disclosure will be described below with reference to FIG. 3.

Figure 3:
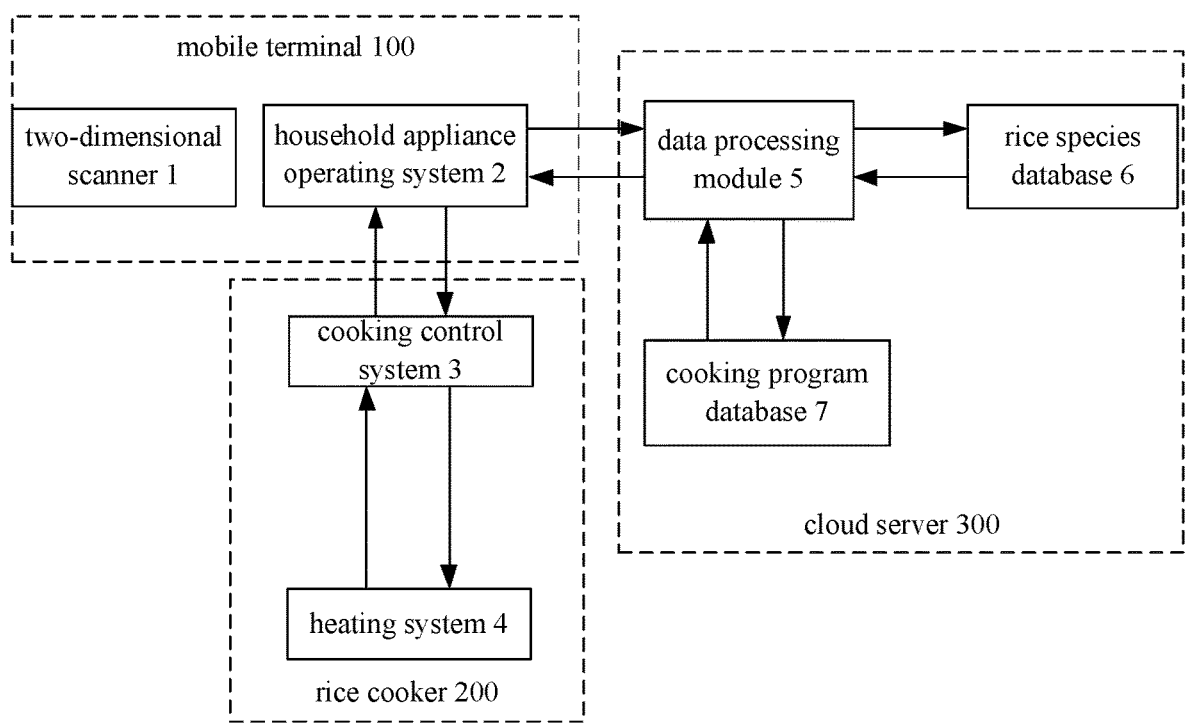
FIG. 3 is a block schematic diagram of a cooking control device of a cooking utensil according to an embodiment of the present disclosure.

FIG. 3 is shows a schematic working process of a cooking control device of a cooking utensil according to one embodiment of the present disclosure.

As shown in FIG. 3, description is given by taking an example that cooking preference information of a user and a rice species identifier are acquired by a mobile terminal. The cooking preference information and the rice species identifier may be in put by the user through a household appliance operating system 2 in the mobile terminal. Alternatively, the rice species identifier may be acquired by a two-dimensional scanner 1, based on which a data request for querying a rice species type corresponding to the rice species identifier is sent to a data processing module 5 in a cloud server 300; after receiving the data request, the data processing module 5 of the cloud server 300 queries a rice species database 6 according to the data request received to acquire the rice species type corresponding to the rice species identifier; the data processing module 5 in the cloud server 300 then queries a cooking curve from a cooking program database 7 according to the cooking preferences acquired and the rice species type; the data processing module 5 analyses the cooking curve acquired to obtain a control parameter and synchronizes the control parameter obtained to a cooking control system 3 through the household appliance operating system 2; and the cooking control system 3 then controls a heating system 4 of the cooking utensil based on the control parameter obtained, so that the cooking utensil acquires the cooking curve corresponding to different rice species types and cooking preference information and adjusts the cooking process of the cooking utensil based on the cooking curve specifically, thus satisfying user's different cooking needs.

In this embodiment, the household appliance operating system 2 may be provided in a mobile terminal 100 or a rice cooker 200.

In addition, it can be seen from the schematic working process of the cooking control device that, during the cooking process of the cooking utensil, the heating system can send a cooking status parameter to a cloud server for storage and analysis through the cooking control system and the household appliance operating system. The cooking utensil adjusts the cooking curve according to the cooking status parameter sent back from the cloud server. That is, the cooking utensil can establish a closed-loop improvement process during the cooking process with the cooking status parameter sent back, so that the cooking utensil is provide with a machine learning function. By continuous learning, the cooking effects of the cooking utensil can be continuously improved with the use of the cooking utensil so as to better meet the needs of the user.

Above all, in the cooking control device of the cooking utensil according to embodiments of the present disclosure, the rice species identifier and the rice species type are acquired by the first acquiring module and the second acquiring module, respectively; the preference information of the user is received by the receiving module; the cooking curve corresponding to the rice species type and the cooking preference information of the user is acquired by the third acquiring module; and the cooking process of the cooking utensil is controlled by the controlling module based on the cooking curve acquired, such that it is possible to control the cooking utensil based on different rice species types, texture, flavors or the cooking preference information of the user, thereby greatly improving the cooking effects of the cooking utensil and meet the user's different requirements of use.

In addition, an embodiment of the present disclosure further provides a cooking utensil comprising the cooking control device of the cooking utensil above-described.

This cooking utensil may set different cooking modes based on different rice species types, texture, flavors or cooking preference information of a user, thereby greatly improve the cooking effects of the cooking utensil and meet the user's different requirements of use.

In order to facilitate to understand the cooking control method, the cooking control device and a working process of the cooking utensil according to embodiments of the present disclosure, the working process of the cooking utensil will be described below with reference to FIG. 4 and FIG. 5.

Figure 4:
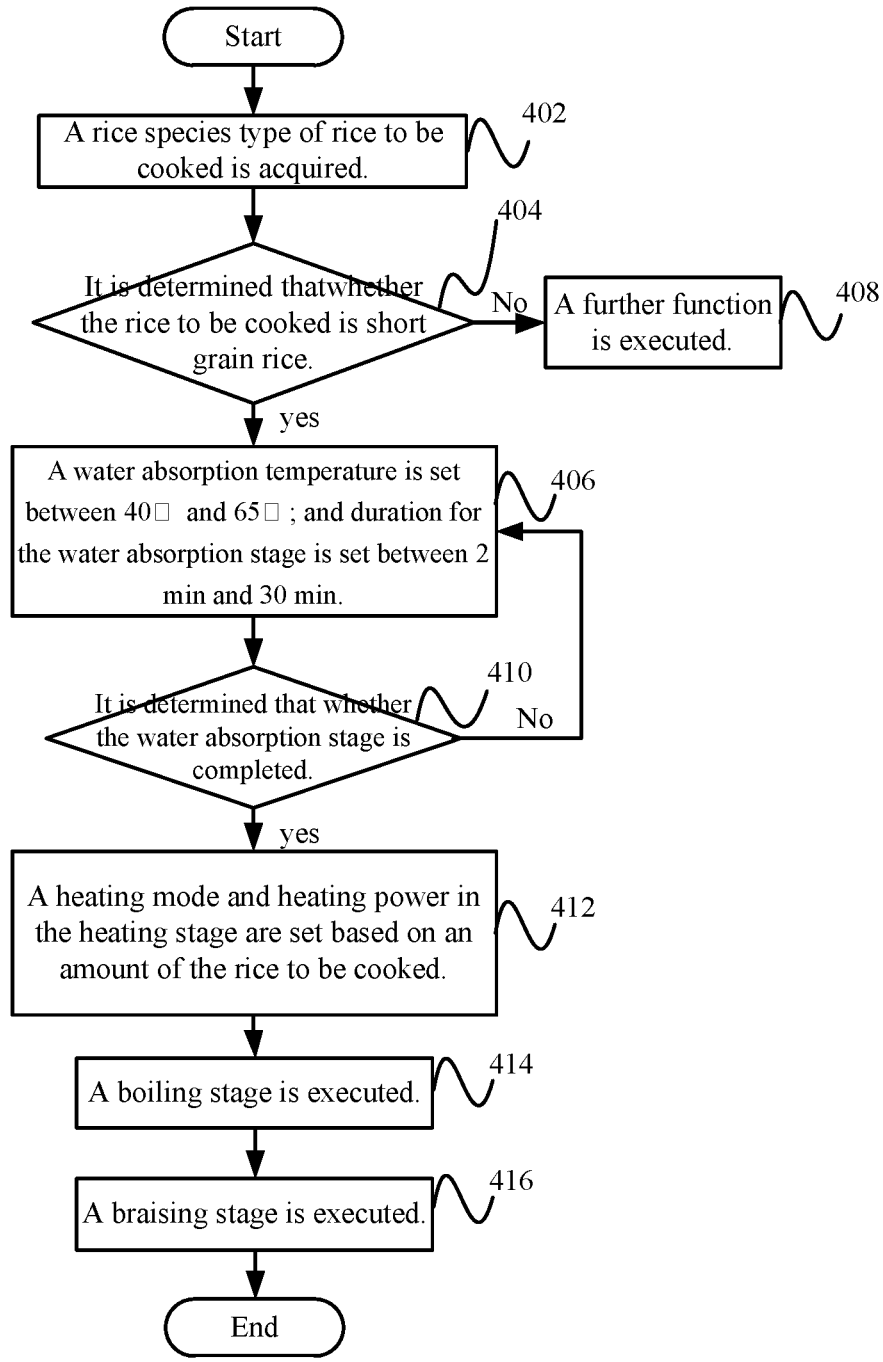
FIG. 4 is a flowchart of a process of controlling cooking stages of a cooking utensil according to an embodiment of the present disclosure.

FIG. 4 is a flowchart of a process of controlling cooking stages according to one embodiment of the present disclosure. As shown in FIG. 4, the process of controlling cooking stages of the cooking utensil may include the following steps S402 to S416.

S402, a rice species identifier of rice to be cooked in the cooking utensil is acquired.

S404, it is determined that whether the rice to be cooked is short grain rice; if yes, the step S406 is executed; otherwise, the step S408 is executed.

S406, a water absorption temperature of the short grain rice in a water absorption stage is set to be higher than that of long grain rice in the water absorption stage; and duration of the short grain rice for the water absorption stage is set to be longer than that of the long grain rice in the water absorption stage.

S408, a further function is executed, for example, in the case that the rice to be cooked is the long grain rice, the control parameter is adjusted accordingly.

S410, it is determined that whether the water absorption stage is completed; if yes, the step S412 is executed, otherwise, the step S406 is executed again.

S412, a heating mode and heating power of a heating stage are set based on an amount of the rice to be cooked.

S414, after the heating stage is completed, the cooking utensil is controlled to enter a boiling stage.

S416, after the boiling stage is completed, controlling the cooking utensil to enter a braising stage.

Figure 5:
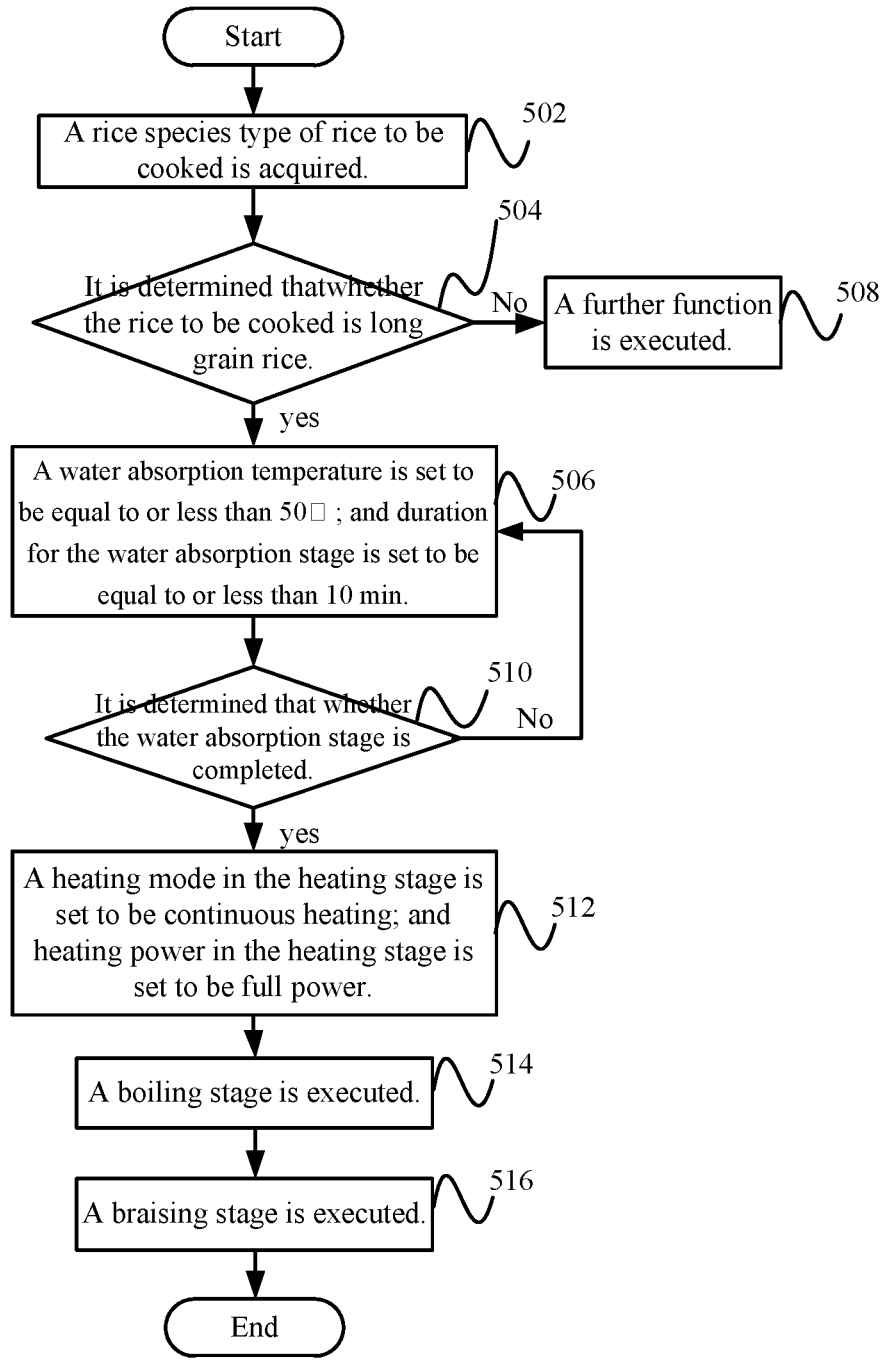
FIG. 5 is a flowchart of a process of controlling cooking stages of a cooking utensil according to another embodiment of the present disclosure.

FIG. 5 is a flowchart of a process of controlling cooking stages according to another embodiment of the present disclosure. As shown in FIG. 5, the process of controlling cooking stages of the cooking utensil may include the following steps S502 to S516.

S502, a rice species identifier of rice to be cooked is acquired.

S504, it is determined that whether the rice to be cooked is long grain rice; if yes, the step S506 is executed; otherwise, the step S508 is executed.

S506, a water absorption temperature of the long grain rice in a water absorption stage is set to be lower than that of short grain rice in the water absorption stage; and duration of the long grain rice for the water absorption stage is set to be shorter than that of the long grain rice in the water absorption stage. The best may be without water absorption. No water absorption stage may be ideal for the long grain rice.

S508, a further function is executed, for example, in the case that the rice to be cooked is the short grain rice, the control parameter is adjusted accordingly.

S510, it is determined that whether the water absorption stage is completed; if yes, the step S512 is executed; otherwise, the step S506 is executed again.

S512, the heating mode in the heating stage is set to be continuous heating, and the heating power in the heating stage is set to be full power.

S514, after the heating stage is completed, the cooking utensil is controlled to enter a boiling stage.

S516, after the boiling stage is completed, the cooking utensil is controlled to enter a braising stage.

Reference throughout this specification to "an embodiment", "some embodiments", "one embodiment", "another example", "an example", "a specific example" or "some examples" means that a some feature, structure, material, or characteristic described in connection with the embodiment or example is included in at least one embodiment or example of the present disclosure. In the present specification, a schematic expression of the above terms does not necessarily refer to the same embodiment or example. Furthermore, the some features, structures, materials, or characteristics may be combined in any suitable manner in one or more embodiments or examples. In addition, different embodiments or examples described in this specification and features of different embodiments or examples may be combined by those skilled in the art without mutual contradiction.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A cooking control method of a cooking utensil, comprising:
    acquiring a rice species identifier of rice to be cooked;
    receiving cooking preference information of a user;
    acquiring a rice species type corresponding to the rice species identifier;
    acquiring a cooking curve corresponding to the cooking preference information and the rice species type; and
    controlling the cooking utensil based on the cooking curve;
    wherein the rice species identifier is obtained by at least one of following methods: scanning a two-dimensional code in a rice bag by a mobile terminal of the user, or acquiring from an e-commerce purchase record of the user, or inputting the rice species identifier on the mobile terminal by the user;
    wherein the cooking preference information of the user includes one or more of texture information, viscosity information or flavor information selected by the user;
    wherein acquiring the rice species type corresponding to the rice species identifier further comprises:
    sending a data request for acquiring the rice species type corresponding to the rice species identifier to a cloud server, and acquiring the rice species type corresponding to the rice species identifier from the cloud server;
    wherein the cloud server stores a correspondence between the rice species identifier and the rice species type.

2. The cooking control method of the cooking utensil according to claim 1, wherein
    the cooking curve comprises at least one cooking stage, with each cooking stage having an individual control parameter, and
    controlling the cooking utensil based on the cooking curve comprises:
    controlling the cooking utensil to cook rice to be cooked in the at least one cooking stage based on the individual control parameter corresponding to the at least one cooking stage, respectively.

3. The cooking control method of the cooking utensil according to claim 2, wherein
    the rice species type comprises long grain rice and short grain rice,
    the at least one cooking stage comprises a water absorption stage, and
    a control parameter corresponding to the water absorption stage comprises a water absorption temperature and/or duration, wherein
    the water absorption temperature of the long grain rice in the water absorption stage is lower than that of the short grain rice in the water absorption stage; and/or
    the duration of the long grain rice for the water absorption stage is less than that of the short grain rice in the water absorption stage.

4. The cooking control method of the cooking utensil according to claim 3, wherein
    the water absorption temperature of the long grain rice in the water absorption stage is equal to or less than 50° C.; and the water absorption temperature of the short grain rice in the water absorption stage is between 40° C. and 65° C.; and/or
    the duration of the long grain rice for the water absorption stage is equal to or less than 10 min; and the duration of the short grain rice for the water absorption stage is between 2 min and 30 min.

5. The cooking control method of the cooking utensil according to claim 3, wherein the rice species type comprises long grain rice and short grain rice, the at least one cooking stage comprises a heating stage, and a control parameter corresponding to the heating stage comprises a heating mode and heating power, wherein acquiring a cooking curve corresponding to the cooking preference information and the rice species type comprises:

setting the heating mode of the heating stage as continuous heating and the heating power of the heating stage as full power in a case that the rice species type is the long grain rice;

setting the heating mode and the heating power of the heating stage based on an amount of the rice to be cooked in a case that the rice species type is the short grain rice.

6. The cooking control method of the cooking utensil according to claim 5, wherein controlling the cooking utensil based on the cooking curve comprises:

controlling the cooking utensil to enter a boiling stage after the heating stage is completed.

7. The cooking control method of the cooking utensil according to claim 1, wherein acquiring the cooking curve corresponding to the cooking preference information and the rice species type further comprises:

acquiring the cooking curve from a cooking program database on a cloud server based on the cooking preference information of the user and the rice species type;

wherein the cooking program database stores a plurality of cooking curves corresponding to the cooking preference information of different users and different rice species types.

8. The cooking control method of the cooking utensil according to claim 1, wherein the cooking utensil comprises a rice cooker, an induction cooker or an electric pressure cooker.

9. The cooking control method of the cooking utensil according to claim 1, further comprising:

acquiring cooking status parameter in real time during cooking;

sending the cooking status parameter to the cloud server in real time for storage and analysis;

sending, by the cloud server, the cooking status parameter to the cooking utensil; and adjusting the cooking curve according to the cooking status parameter sent back from the cloud server.

* * * * *